(12) United States Patent
Graham et al.

(10) Patent No.: US 9,744,440 B1
(45) Date of Patent: Aug. 29, 2017

(54) GENERATING GAME CONFIGURATIONS

(71) Applicant: Zynga Inc., San Francisco, CA (US)

(72) Inventors: M. Ian Graham, San Francisco, CA (US); Ya-Bing Chu, Burlingame, CA (US)

(73) Assignee: Zynga Inc., San Francisco, CA (US)

( * ) Notice: Subject to any disclaimer, the term of this patent is extended or adjusted under 35 U.S.C. 154(b) by 880 days.

(21) Appl. No.: 13/739,343

(22) Filed: Jan. 11, 2013

Related U.S. Application Data

(60) Provisional application No. 61/586,027, filed on Jan. 12, 2012.

(51) Int. Cl.
*A63F 13/00* (2014.01)
*A63F 9/24* (2006.01)
*A63F 13/67* (2014.01)
*A63F 13/60* (2014.01)

(52) U.S. Cl.
CPC ........... *A63F 9/24* (2013.01); *A63F 13/60* (2014.09); *A63F 13/67* (2014.09); *A63F 2300/5533* (2013.01); *A63F 2300/6027* (2013.01)

(58) Field of Classification Search
CPC ........ A63F 2300/554; A63F 2300/5533; A63F 2300/5546; A63F 2300/6027; A63F 13/49; A63F 13/493
See application file for complete search history.

(56) References Cited

U.S. PATENT DOCUMENTS

| | | | | |
|---|---|---|---|---|
| 6,106,395 | A | * | 8/2000 | Begis .............................. 463/23 |
| 6,110,041 | A | * | 8/2000 | Walker et al. .................. 463/20 |
| 6,267,673 | B1 | * | 7/2001 | Miyamoto et al. ............. 463/31 |
| 7,293,235 | B1 | * | 11/2007 | Powers et al. ................ 715/706 |
| 8,979,625 | B2 | * | 3/2015 | Englman et al. ............... 463/16 |
| 8,979,646 | B2 | * | 3/2015 | Moser et al. ................... 463/29 |
| 2002/0137217 | A1 | * | 9/2002 | Rowe .............................. 436/42 |
| 2004/0229698 | A1 | * | 11/2004 | Lind et al. ...................... 463/42 |
| 2006/0248161 | A1 | * | 11/2006 | O'Brien et al. .............. 709/217 |
| 2007/0032288 | A1 | * | 2/2007 | Nelson et al. .................. 463/16 |
| 2007/0156676 | A1 | * | 7/2007 | Rosenberg ......................... 707/5 |

(Continued)

FOREIGN PATENT DOCUMENTS

GB 2406291 A * 3/2005 ............. A63F 13/12

*Primary Examiner* — Steven J Hylinski
(74) *Attorney, Agent, or Firm* — Schwegman Lundberg & Woessner, P.A.

(57) ABSTRACT

A system, computer-readable storage medium storing at least one program, and a computer-implemented method for generating game configurations are presented. For example, a system may receive a game configuration request message from a client device being operated by a player playing a virtual game. The game configuration request message may be sent, for example, in response to the player initiating a new game of the virtual game. The system may then select a game configuration based at least in part on historical performance data associated with the selected game configuration. The historical performance data may accumulate performance data from a group of players that previously played the virtual game using the selected game configuration. The system then communicates the selected game configuration to the client device. The player may play the virtual game using the selected game configuration as the initial game configuration for the virtual game.

13 Claims, 10 Drawing Sheets

(56) References Cited

U.S. PATENT DOCUMENTS

| | | |
|---|---|---|
| 2008/0138773 A1* | 6/2008 | Lathrop .......................... 434/72 |
| 2009/0118002 A1* | 5/2009 | Lyons et al. .................... 463/29 |
| 2009/0150357 A1* | 6/2009 | Iizuka .............................. 707/3 |
| 2009/0299960 A1* | 12/2009 | Lineberger ...................... 707/3 |
| 2011/0007079 A1* | 1/2011 | Perez et al. ................... 345/473 |
| 2012/0115616 A1* | 5/2012 | Phillips et al. ................. 463/42 |
| 2012/0123567 A1* | 5/2012 | Nayak et al. ................... 700/91 |
| 2013/0123004 A1* | 5/2013 | Kruglick ........................ 463/29 |

* cited by examiner

GENERATING GAME CONFIGURATIONS

CROSS REFERENCE TO RELATED APPLICATIONS

This application claims priority from U.S. Provisional Application No. 61/586,027, filed Jan. 12, 2012, all of which is incorporated herein by reference in its entirety for all purposes.

TECHNICAL FIELD

The present disclosure relates to gaming systems. In an example embodiment, a gaming system uses historical performance data to generate a game configuration for a game board.

BACKGROUND

Traditional game systems may host virtual games that a player may access. In many cases, the virtual games may present a game board (e.g., a grid of letters, tiles, or the like) that a player is to interact with to achieve one or more objectives (e.g., forming words, locating game objects (e.g., bombs), and the like). As an example, the popular game MINESWEEPER, as often bundled by operating systems such as MICROSOFT®, may present a game board that includes a grid of undifferentiated squares, some of which, unknown to the player, are designated by the traditional game system as being mines. A player then plays a game of MINESWEEPER by: selecting a square, receiving an indication of whether the selected square is a mine, or receiving an indication of a number of mines adjacent to the selected square. If the square is a mine, the game presents an indication that the player lost the virtual game and then ends the virtual game. Otherwise, the player may select another square from the grid and receives the appropriate indications again. The player continues to select other squares in this manner until only the boxes that were designated as mines are left on the game board.

To vary the user experience, these traditional game systems may vary the game board used by various instances of the board game. For example, with MINESWEEPER, a traditional game system may randomly select boxes within the grid to represent the mines. In this way, the traditional game system may present unpredictable challenges to the player.

BRIEF DESCRIPTION OF THE DRAWINGS

The present disclosure is illustrated by way of example, and not limitation, in the figures of the accompanying drawings, in which like reference numerals indicate similar elements unless otherwise indicated. In the drawings.

DESCRIPTION OF EXAMPLE EMBODIMENTS

Overview

Figure 1:
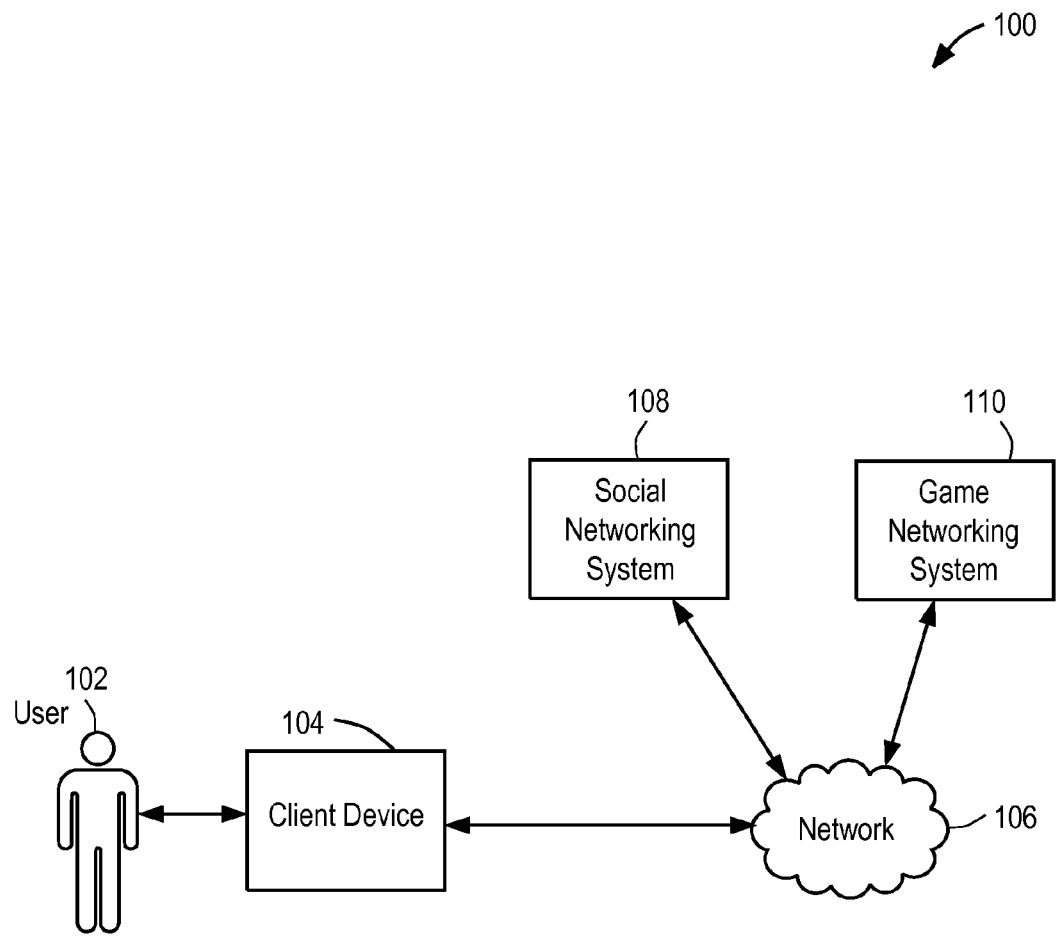
FIG. 1 illustrates an example of a game system for implementing various example embodiments.

Users of computer-implemented systems may access and interact with a gaming environment to play various types of virtual games. For example, a user (e.g., a player) may access a virtual game hosted by a gaming platform, as provided by Zynga, Inc., in which a game board is presented as a grid of tiles containing one or more letters. As used herein, the term "game board" may refer to an instance of a playing area in which a player interacts with to play that game. By way of example and not limitation, a game board may represent a grid (e.g., 2×2, 3×3, 4×4, 5×5, and so on) of tiles in which a player may interact with to form words. For example, each tile of the grid may represent a different letter, and the player may form words by selecting adjacent tiles in a particular sequence. In other word forming games, the player may form a word by placing letters from a set of available letters in consecutive horizontal or vertical rows. It is to be appreciated that the term "game board" may be used to refer to any suitable type of playing area used in a virtual game. For example, in addition to the above word forming game boards, other game boards may represent a board game (e.g., a chess board, a checkers board, or any other suitable board), a maze, a race track, a list of words, a grid hiding bombs, or any other representation of a playable game.

As used herein, the term "game configuration," or simply "configuration," may refer to logic or data that specifies or otherwise govern how the state of a game is to change over the duration of the game. For example, in some embodiments, a game configuration for a game board may specify a rule or constraint that governs how the state of the game can change. By way of example and not limitation, in the context of a chess game, a game configuration may include environmental rules or constraints that specify the size of the chess board, or modified rules such as "rooks can only move four spaces away" or "provide a handicap in favor of player 2 that lets him make two moves to start." Additionally or alternatively, the game configuration for a game board may specify the initial setup of a game board. For example, the game configuration for a Scramble With Friends® game board may specify the letters arranged in a grid.

It is to be appreciated that a game configuration for a game board is different from the game state of a game board. Such is the case because a "game state," as used herein, may refer to data that specifies the result of game activity on a game board at a particular point during game play, which, in some cases, is a result of the game activity occurring within the virtual game since the game began. For example, in the context of chess, the game state is the current arrangement of chess pieces on the chess board at turn three. However, the game configuration for the game board may be the arrangement of the chess pieces prior to any player making a move (e.g., move zero) and the set of rules governing the operation of each chess piece.

As described herein, the gaming platform may use historical performance data to generate a game configuration for a game board used in a virtual game. A past score achieved by a player is one example of historical performance data that the gaming platform may use to generate a game configuration for a game board. In some embodiments, the gaming platform may use such historical performance data to generate a game configuration for the game board for an instance of a virtual game that corresponds to the experience level of a player (e.g., a board associated with higher scores for a beginner, a board associated with lower scores for an experienced player).

In an example embodiment, a computer-implemented method may receive a game configuration request message from a client device being operated by a first player playing a virtual game. The game configuration request message may be sent, for example, in response to the first player initiating a new game or instance of the virtual game. The method may then select a game configuration based at least in part on historical performance data associated with the selected game configuration. The historical performance data may accumulate performance data from a group of players that previously played the virtual game using the selected game configuration. The method may then communicate the selected game configuration to the client device. The player may then play an instance of the virtual game using the selected game configuration for the game board used in the virtual game.

Further, in example embodiments, a computer-implemented method may later receive, from the client device being operated by the player, performance data relating to a performance metric of the virtual game played by the player using the previously selected game configuration. A score achieved by the player is an example of a performance metric contemplated by this disclosure. After receiving the performance data, the method may then incorporate the performance data with the historical performance data associated with the game configuration.

These and other embodiments of the invention are described in further detail below.

Example System

FIG. 1 illustrates an example of a game system 100 for implementing various example embodiments. In some embodiments, the game system 100 comprises a user 102, a client device 104, a network 106, a social networking system 108, and a game networking system 110. The components of the game system 100 may be connected directly or over a network 106, which may be any suitable network. In various embodiments, one or more portions of the network 106 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks.

Although FIG. 1 illustrates a particular example of the arrangement of the user 102, the client device 104, the social networking system 108, the game networking system 110, and the network 106, this disclosure includes any suitable arrangement or configuration of the user 102, the client device 104, the social networking system 108, the game networking system 110, and the network 106.

The client device 104 may be any suitable computing device, such as a smart phone, a personal digital assistant, a mobile phone, a personal computer, a laptop, a computing tablet, or any other device suitable for playing a virtual game. The client device 104 may access the social networking system 108 or the game networking system 110 directly, via the network 106, or via a third-party system. For example, the client device 104 may access the game networking system 110 via the social networking system 108. The client device 104 may be any suitable computing device, such as a personal computer, laptop, cellular phone, smart phone, computing tablet, etc.

The social networking system 108 may include a network-addressable computing system that can host one or more social graphs (see for example FIG. 2), and may be accessed by the other components of game system 100 either directly or via the network 106. The social networking system 108 may generate, store, receive, and transmit social networking data.

Figure 2:
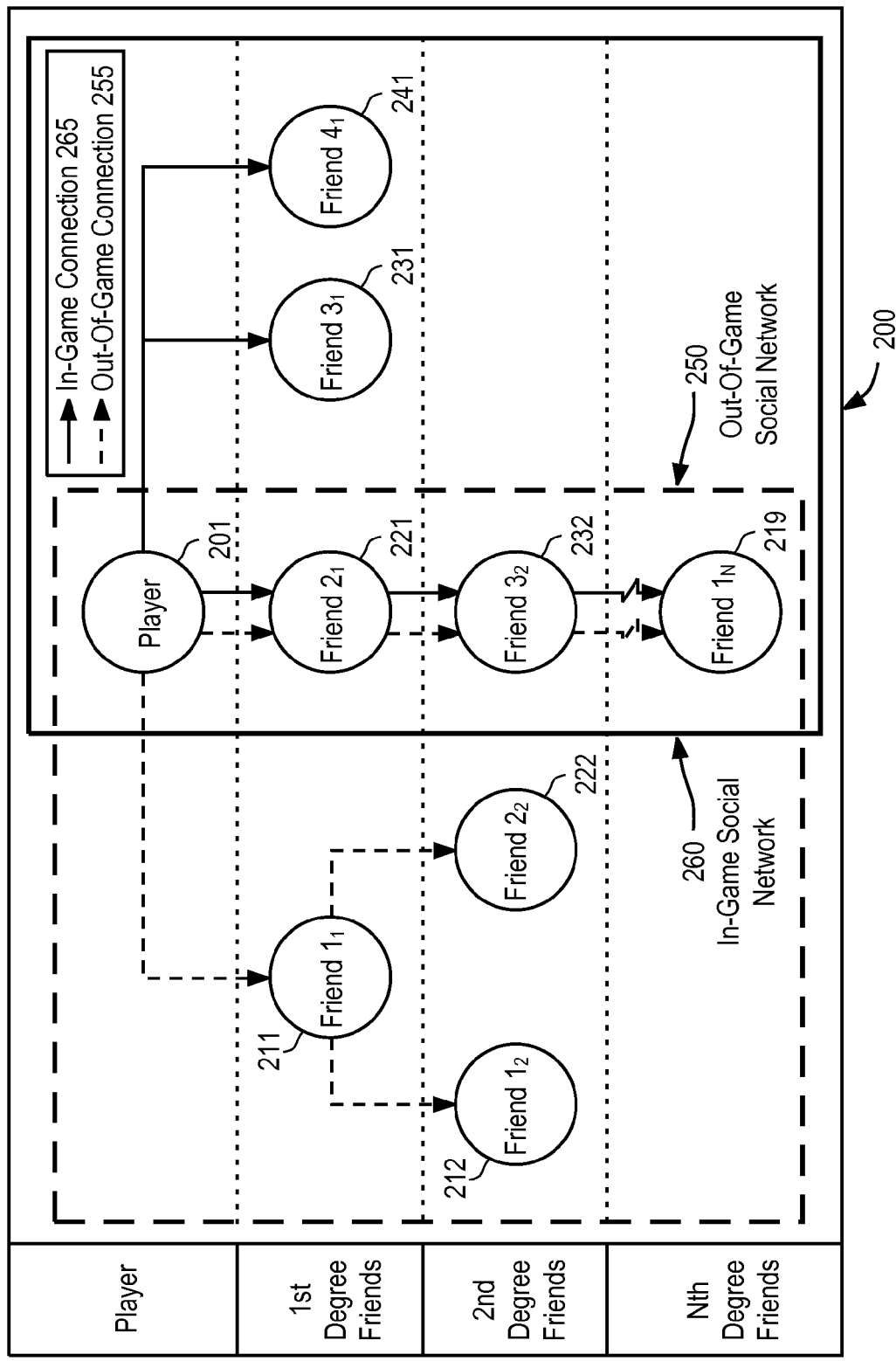
FIG. 2 shows an example of a social network within a social graph, according to an example embodiment.

FIG. 2 shows an example of a social network within a social graph 200. Social graph 200 is shown by way of example to include an out-of-game social network 250, and an in-game social network 260. Moreover, in-game social network 260 may include one or more users that are friends with Player 201 (e.g., Friend 231), and may include one or more other users that are not friends with Player 201. The social graph 200 may correspond to the various users associated with the virtual game. In an example embodiment, each user may "build" their own virtual structures using branded virtual objects and/or unbranded virtual objects. When, for example, Player 201 visits the virtual environment of Friend 231, the virtual environment displayed to Player 201 includes branded objects selected and placed in that environment by Friend 231.

With reference back to FIG. 1, the game networking system 110 may include a network-addressable computing system (or systems) that can host one or more virtual games, for example, online games. The game networking system 110 may generate, store, receive, and transmit game-related data, such as, for example, game account data, game input, game configuration data, and game displays. The game networking system 110 may be accessed by the other components of game system 100 either directly or via the network 106. The user 102 may use the client device 104 to access, send data to, and receive data from the social networking system 108 and/or the game networking system 110.

Example Modules

Figure 3:
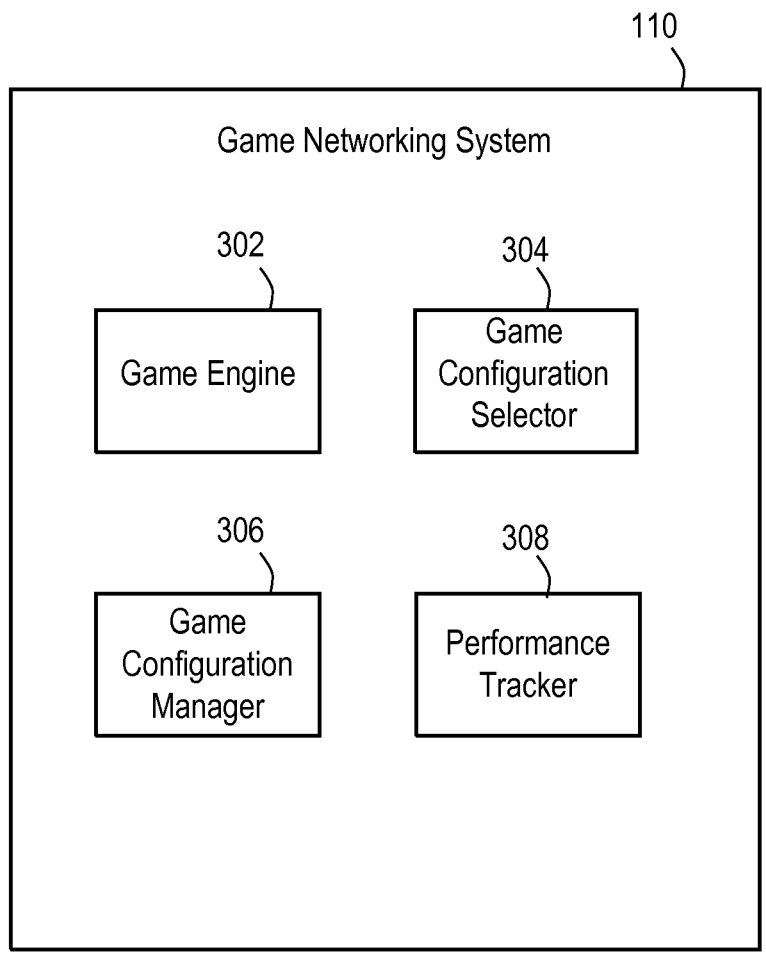
FIG. 3 is a block diagram illustrating various modules that may be configured to generate a game configuration for a game board using historical performance data, according to an example embodiment.

Example modules of the game system 100 are now described. For example, FIG. 3 is a block diagram illustrating various modules that may be configured to generate a game configuration for a game board using historical performance data, according to an example embodiment. In an example embodiment, as shown in FIG. 3, the game networking system 110 may include a game engine 302, a game configuration selector 304, a game configuration manager 306, and a performance tracker 308. It is to be appreciated that the particular embodiment shown in FIG. 3 is provided by way of example and not limitation and that other embodiments consistent with this disclosure may utilize different game configurations. For example, in some embodiments, the client device 104 may include one or more of the modules shown in FIG. 3 to provide distributed processing for the generation of a game configuration for a game board.

The game engine 302 may perform operations related to generating, storing, receiving, and transmitting game-related data, such as, for example, game account data, game input, game configuration data, a game board, and game displays.

The game configuration selector 304 may be a computer-implemented module configured to perform operations related to selecting a game configuration for a game board. As described in greater detail below, the game configuration selector 304 may, in some embodiments, select a game configuration for a game board based on historical performance data associated with the game configuration. For example, in some cases, the game configuration selector 304 may select a game configuration that corresponds to a range of scores achieved by other players of the virtual game. Also described in greater detail below, the game configuration selector 304 may select a game configuration using a game configuration heuristic.

The game configuration manager 306 may be a computer-implemented module configured to maintain a game configuration library. A game configuration library may be a data store that associates a particular game configuration with historical performance data, such as an average game score or a rating.

The performance tracker 308 may be a computer-implemented module configured to receive and associate performance data with a particular game configuration. For example, in some embodiments, the performance tracker 308 may receive an indication of a score achieved by a player when the player plays the virtual game using the game configuration. The performance tracker 308 may then update the historical performance data for the game configuration to incorporate the score just achieved by the player. Such incorporation may include recalculating an average for a performance metric being tracked by the historical performance data, incrementing the performance metric being tracked, or any other suitable operation that aggregates the performance data with the historical performance data.

Figure 6:
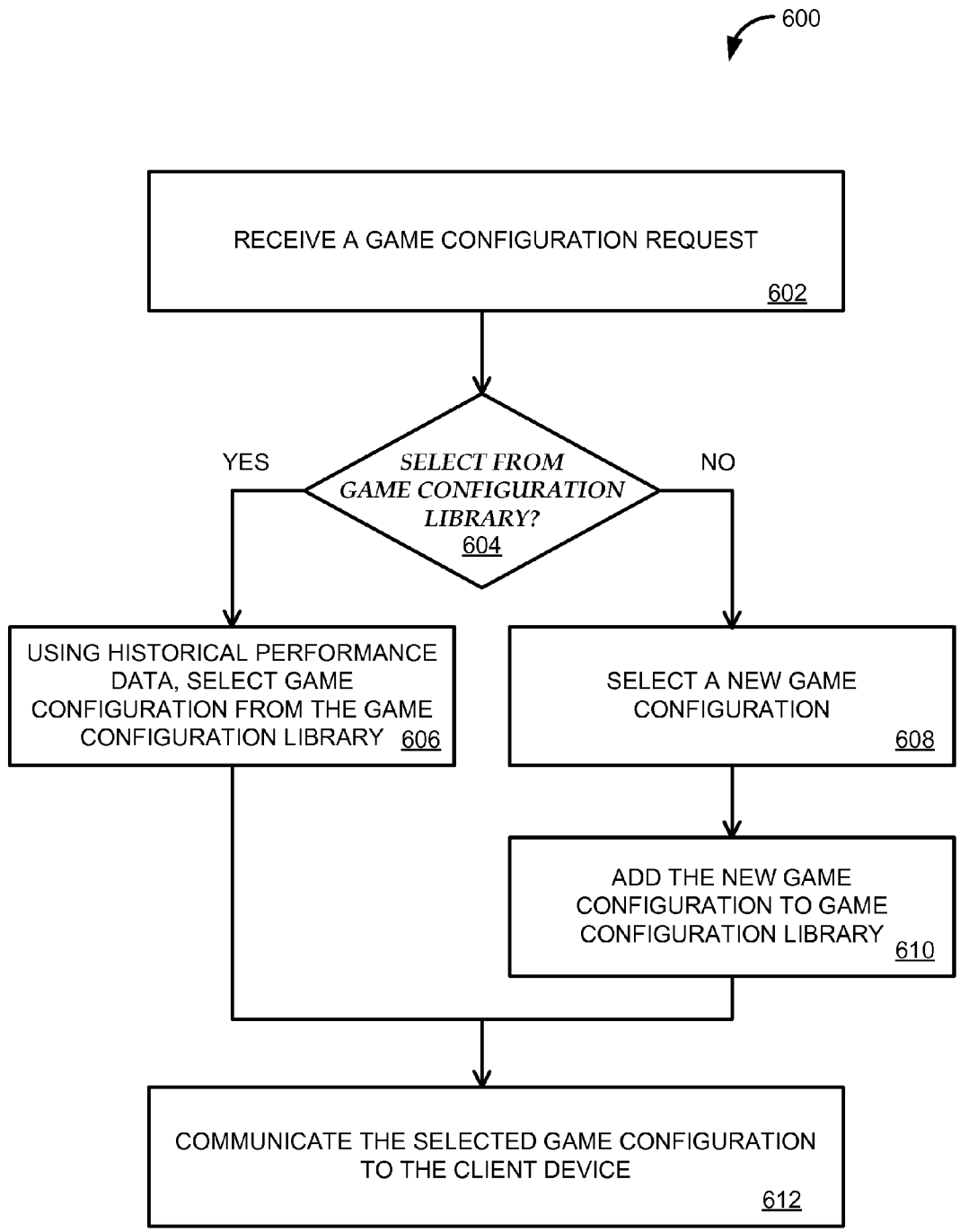
FIG. 6 is a flowchart illustrating an example method of using historical performance data to generate a game configuration for a game board, according to an example embodiment.

The operation of the game engine 302, the game configuration selector 304, the game configuration manager 306, and the performance tracker 308 are described in greater detail below, with reference to FIGS. 6-8.

Example Data Models

Figure 4:
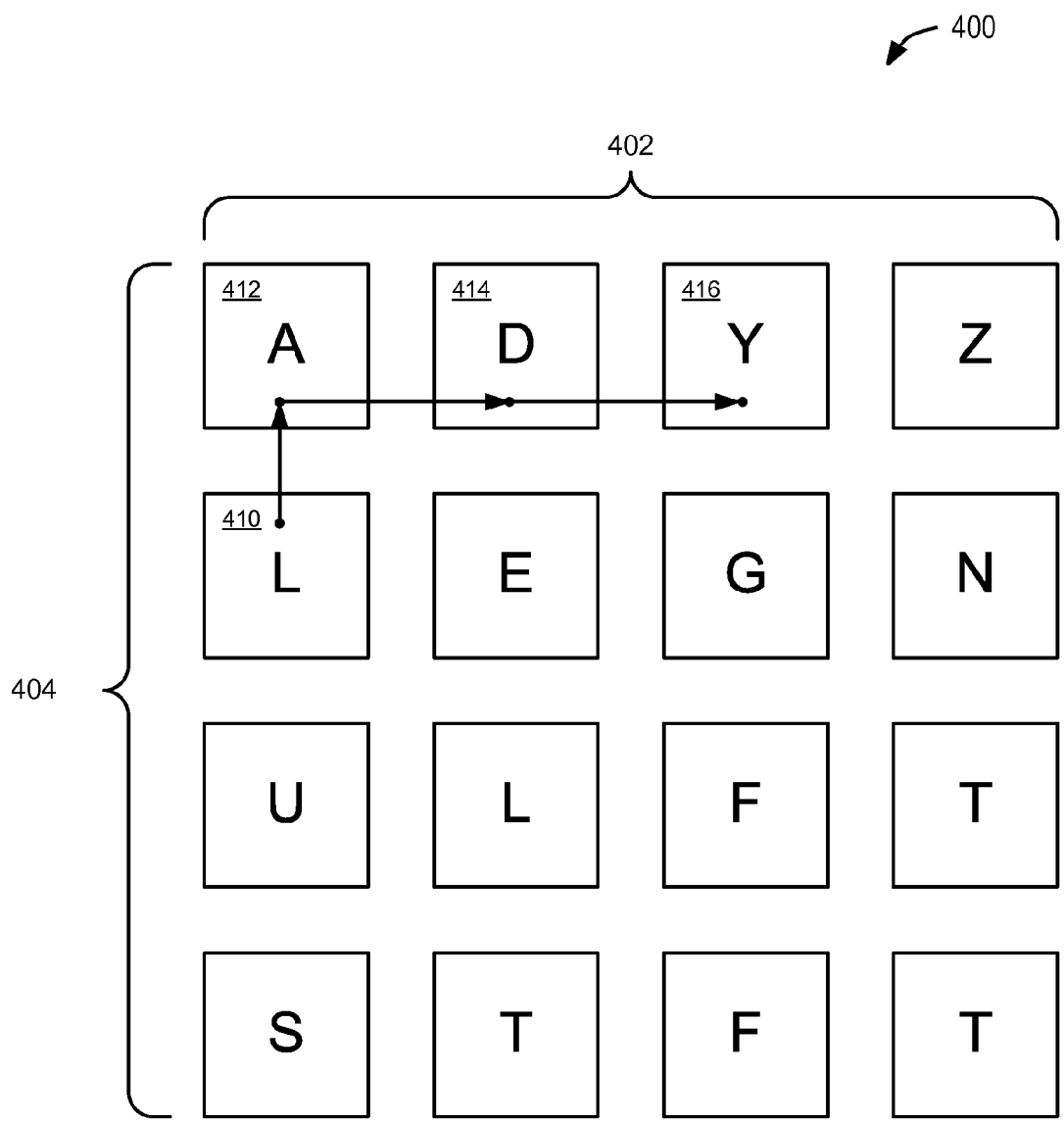
FIG. 4 is a diagram illustrating a game board, according to an example embodiment.

Example data models utilized by the game system 100 are now described. FIG. 4 is a diagram illustrating a game configuration for a game board 400, according to an example embodiment. As FIG. 4 shows, the game configuration may specify that the game board 400 represents a grid of letters organized in columns 402 and rows 404. In the context of the game board 400 shown in FIG. 4, the game configuration for game board 400 specify which letters are to be located at particular locations within the grid. In an example embodiment, the game configuration for the game board 400 may be stored as a multidimensional array, table, one dimensional array, linked list, or any other suitable data structure. By way of example and not limitation, the game board 400 may be used in a word forming game, such as Scramble With Friends®, as provided by Zynga Inc®. Such word forming games may operate according to the player selecting a sequence of adjacent tiles that, when combined in the sequence of the selection, forms a valid word. For example, responsive to a player selecting tiles 410, 412, 414, and 416, the game engine 302 may determine that the sequence of tiles (i.e., 410, 412, 414, and 416) forms the word "LADY."

It is to be appreciated that other game boards may differ from the game board 400 depicted by FIG. 4 based on the game configuration selected for the game board. Further, the difficulty between one game board and another game board may vary considerably depending on the game configuration selected for the two game boards. In some cases, the difficulty of a particular game board may lead to low engagement by the player, as some game boards include relatively few words that can be formed or may include many difficult words that a beginner may miss.

Figure 5:
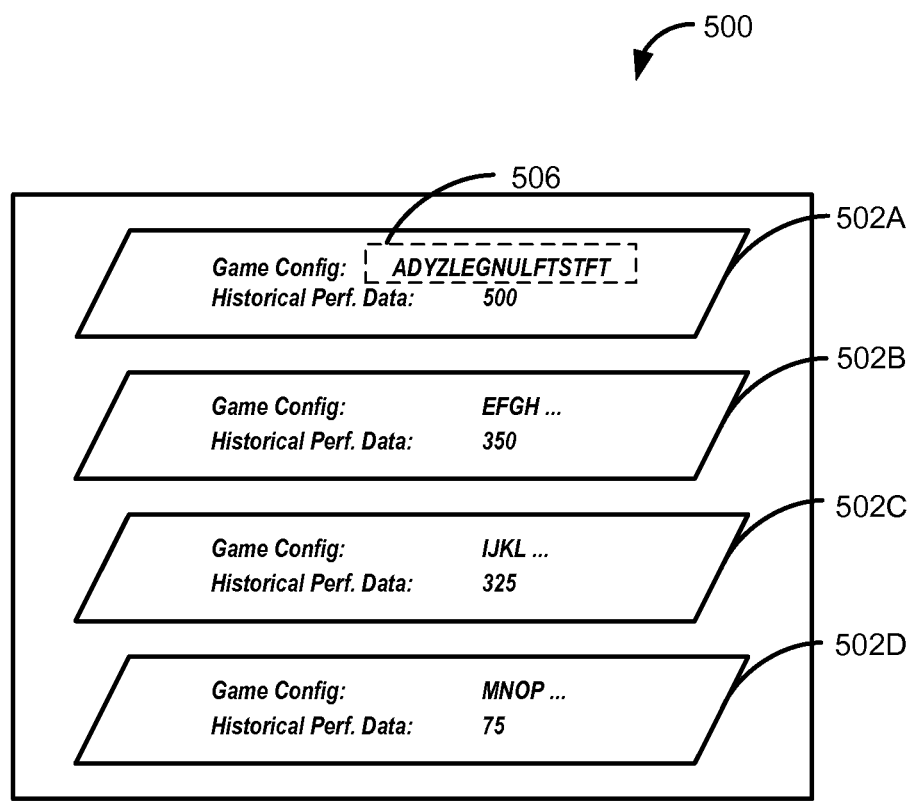
FIG. 5 is a diagram illustrating an example of a game configuration library, as may be maintained by the game configuration manager of FIG. 3, according to an example embodiment.

To select a game configuration for a game board, embodiments may maintain a game configuration library that associates game configurations with historical performance data. FIG. 5 is a diagram illustrating an example of a game configuration library 500, as may be maintained by the game configuration manager 306 of FIG. 3, according to an example embodiment. The game configuration library 500 shown in FIG. 5 may include game configuration records 502A-B. Each of the game configuration records 502A-B may include game configurations and historical performance data associated with game configurations used in past games played by players of the game system 100. As described above, a game configuration may include data relating to rules, constraints, and an initial setup that governs how the state of a game board can change from the beginning of a virtual game to the end of the virtual game. For example, as described above, a game configuration for the game of chess may specify rules defining how a given piece (e.g., a rook) may operate (e.g., limit the number of spaces in a valid move). Further, as also described above, a game configuration for a letter forming game may specify the letters on a game board. As shown in FIG. 5, the game configuration may be a string of letters, where the $i^{th}$ letter of the string corresponds to the letter that is to be associated with position $((i-1) \% M+1, (i-1)/M+1)$ in a M-by-N grid. Using FIG. 5 as an example, the game configuration 506 of the game configuration record 502 may represent the letters displayed by the game board 400 of FIG. 4.

The historical performance data associated with a game configuration may track a performance metric of past games involving the game configuration represented by the game configuration data of the game configuration record. For example, the historical performance data may include statistical data that tracks scores obtained by players playing a game board with a given game configuration, user feedback (e.g., such as a rating of a game board presented with a game configuration), the length of words found, the number of words identified, a time to complete a game board, and the like.

In some embodiments, the game configuration manager 306 may organize the game configuration records 502A-D of the game configuration library 500 according to a function of the historical performance data of each of the game configuration records. For example, as shown in FIG. 5, the game configuration records 502A-C are organized according to a function of highest historical performance data (e.g., 500) to lowest performance data (e.g., 75). Thus, in some embodiments, the game configuration manager 306 may rank the game configuration records according to highest average score to lowest average score, or highest average words found to lowest words found. In other embodiments, the game configuration library 500 may organize the game configuration records 502A-D in groups, for example the game configuration library 500 may organize the game configuration records in groups according to halves, thirds, quarters, and so on.

In some embodiments, the game configuration manager 306 may index the game configuration library 500 according to a game configuration identifier, a ranking, or the like. Accordingly, in some embodiments, the game configuration manager 306, or any other component, may access a game configuration record according to a rank or a particular game configuration identifier. In some embodiments, a game configuration identifier may be generated when a game configuration record is created in the game configuration library 500 or may be a function (e.g., a result of a hash function) of a game configuration.

Example Methods

Example methods of generating a game configuration for a game board are now described. For example, FIG. 6 is a flowchart illustrating an example method 600 of using historical performance data to generate a game configuration for a game board, according to an example embodiment. The method 600 may, in some embodiments, be performed by the systems, components, and modules shown in FIGS. 1 and 3. Accordingly, for the purpose of clarity of description, the method 600 will be described with reference to the game engine 302 and the game configuration selector 304 of FIG. 3.

The method 600 may begin at operation 602 when the game configuration selector 304 receives a game configuration request message from the client device 104. A game configuration request message may be an electronic message that requests the game configuration selector 304 to provide a game configuration for a game board being played on the client device 104. In an example embodiment, the client device 104 may send the game configuration request message to the game networking system 110 responsive to detecting the user 102 selecting a user interface button labeled "New Game," or the like.

After receiving the game configuration request message, the method 600 may continue to decision block 604. The decision block 604 may involve the game configuration selector 304 determining whether to generate a game configuration for the game board by selecting a game configuration from the game configuration library (e.g., operation 606) or by generating a new game configuration (e.g., operation 608). In some embodiments, the determination between generating the game configuration by selecting a game configuration from the game configuration library or by generating a new game configuration is determined based at least in part on a probability function. For example, the game configuration selector 304 may generate the game configuration by selecting the game configuration from the game configuration library X % of the time, while generating the game configuration by generating a new game configuration Y % of the time. It is to be appreciated that some embodiments may vary the probability function so that the values for X and Y change depending on a number of factors, such as skill or experience level of the player, input from a game administrator (e.g., via a game configuration setting, game configuration file, or the like), a score of the player, a number of game played by the player, and the like.

Responsive to determining that the game configuration is to be selected from the game configuration library, the game configuration selector 304 selects a game configuration from the game configuration library. This is shown as operation 606. As described above, the game configuration library (e.g., the game configuration library 500 of FIG. 5) may be a data store that maintains a relationship between a game configuration and historical performance data relating to that game configuration. Accordingly, operation 606 may involve the game configuration selector 304 selecting a game configuration associated with historical performance data obtained from one or more players playing the virtual game with the game configuration. For example, the historical performance data may include an average score obtained by the players playing the virtual game with the game configuration.

It is to be appreciated that selection of a game configuration from the game configuration library may occur in any suitable manner. For example, as described above, the game configuration library may organize game configuration records according to a function of their corresponding historical performance data. In such cases, the game configuration selector 304 may select, for example, the highest ranked game configuration not already communicated to the player. As a further example, also described above, the game configuration library may organize game configuration records according to ranges or buckets (such as, for example, quartiles, thirds, and the like). In such cases, the game configuration selector 304 may select, for example, a game configuration record within a particular range or bucket, such as a top quartile. Selecting a game configuration within a range may be useful in matching a game configuration to a property of a player, such as an experience level. To illustrate, one range of game configuration records may be used to select game records for beginners (as may be measured by an experience level of the player, an amount of games played by the player, player achievements, and the like), while another range of game configuration records may be used to select game configurations for experienced players.

Alternatively, responsive to determining that the game configuration is not to be selected from the game configuration library, the method 600 may branch to operation 608 in which the game configuration selector 304 selects a new game configuration for the game board to be played in a virtual game. In some embodiments, operation 608 may involve the game configuration selector 304 generating a set of random game configurations and then using a game configuration heuristic to select one of the game configurations from the set of game configurations. Generally, a "game configuration heuristic," as used herein, may be data or logic operable to generate a game configuration quality score for a game configuration. The game configuration quality score may be a measurement calculated based on one or more properties of specified by a game configuration. For example, a game configuration heuristic may produce relatively higher game configuration quality score for a game configuration that includes a determinable number of words. Operation 608 is discussed in greater detail below, with respect to FIG. 8.

At operation 610, the game configuration selector 304 may add the new game configuration to the game configuration library. In this way, example embodiments may seed the game configuration library with new game configurations. Seeding the game configuration library in this manner may find a number of practical advantages, such as initializing or otherwise building up the game configuration library for a virtual game that was recently released by the game networking system 110. Further, seeding the game configuration library in this manner may also provide a mechanism to diversify the game configuration library.

At operation 612, the game engine 302 communicates the selected game configuration to the client device that previously sent the game configuration request message. Communicating the game configuration to the client device may involve sending a representation (as may be obtained from the selected game configuration record at operation 606 or the game configuration generated at operation 608) of the game configuration to the client device. Upon receiving the game configuration, the client device then generates and displays a visual representation of a game board corresponding to the game configuration and initiates game play. Additionally or alternatively, the game engine 302 may communicate a game configuration identifier operable to identify the game configuration record corresponding to the game configuration being communicated to the client device 104.

It is to be appreciated that the method 600, in some example embodiments, may provide many practical advantages. For example, in one embodiment, the method 600 may provide comparatively interesting game configurations to a player. Such may be the case when, for example, the method 600 selects a game configuration from the game configuration library that, at least based on the historical performance data, predicts a performance level for the player. For example, where many players scored relatively highly for a particular game configuration, example embodiments may predict that the player will find the particular game configuration interesting. In some cases, as described above, example embodiments of the game configuration library may organize game configurations according to buckets. Accordingly, the game configuration selector 304 may then select a game configuration from a given bucket based on a property of the player (e.g., experience level). Using such a bucketing approach may allow embodiments to consistently challenge a player as the player improves their skill in the game.

As described above, the method 600 may generate a game configuration for a game board using historical performance data, as may be maintained by the game configuration library, for example. In some embodiments, the historical performance data is built up by tracking performance data relating from games played by various players. For example, FIG. 7 is a flowchart illustrating a method 700 that may be performed by embodiments described herein to track performance data. The method 700 may, in some embodiments, be performed by the systems, components, and modules shown in FIGS. 1 and 3. Accordingly the method 700 is described with reference to the game engine 302, the game configuration selector 304, the game configuration manager 306, and the performance tracker 308, as shown in FIG. 3.

The method 700 may begin at operation 702 when the performance tracker 302 receives performance data associated with a game configuration previously communicated to the client device 104 by the game configuration selector 304. As explained above, performance data may include information related to the game play of the game configuration by the player. For example, the performance data may include a score calculated according to a function of a number of words formed by the player when playing the virtual game with the selected game configuration, feedback from the player (e.g., an indication that the player enjoyed or liked the game configuration), timing information relative to when words were formed, or some combination thereof. In some embodiments, the performance data may be received by the performance tracker 302 in a performance update message that includes the performance data and a game configuration identifier.

Responsive to receiving the performance data, the performance tracker 308, at operation 704, updates the historical performance data corresponding to the game configuration just played by the player to reflect the new performance data. For example, the performance tracker module 308 may use the game configuration identifier included in the performance update message as an index into the game configuration library to identify the historical performance data of the game configuration that is to be updated. The performance tracker module 308 may then update the historical performance data to incorporate the performance data received at operation 702. Updating the historical performance data may involve recalculating an average score, average words found, success rate of a game board with the game configuration, time to complete the game board with the game configuration, and the like.

Figure 7:
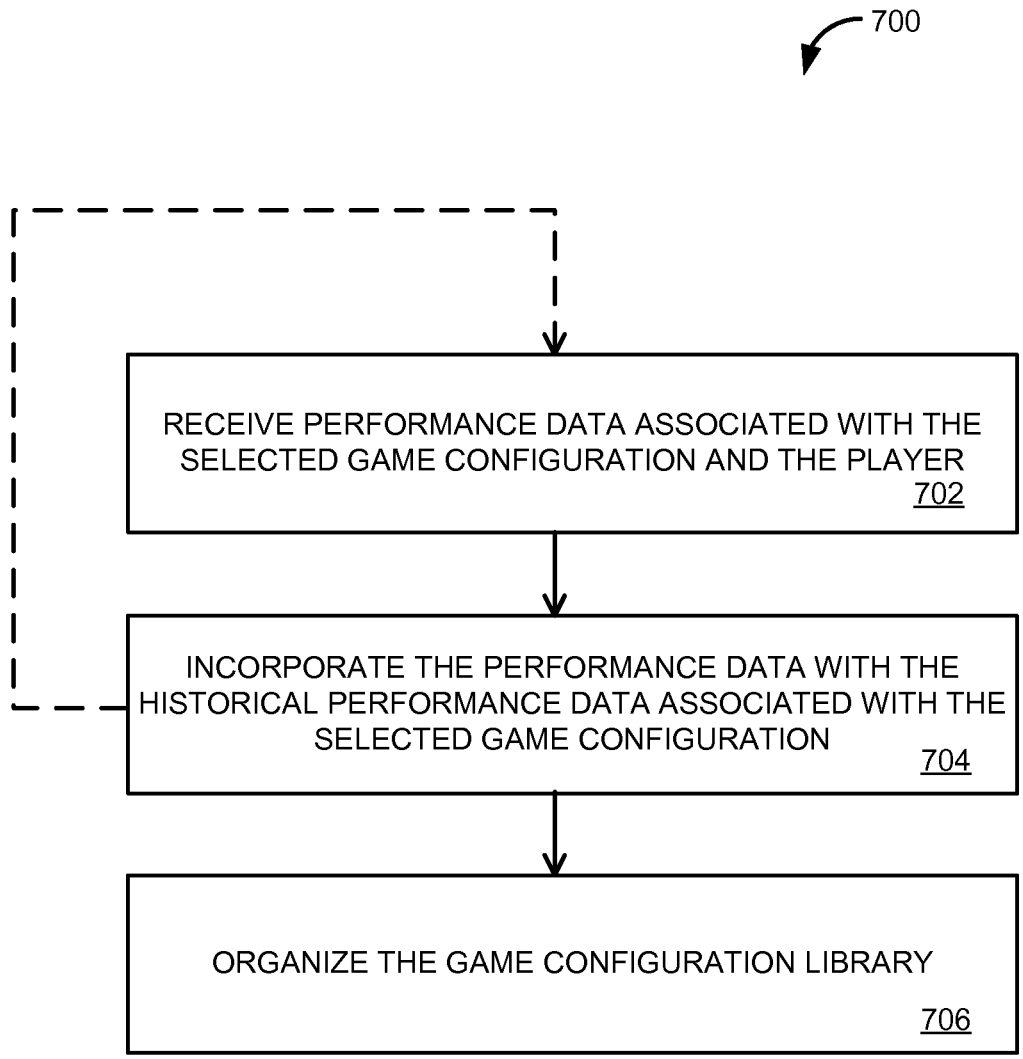
FIG. 7 is a flowchart illustrating a method that may be performed by embodiments described herein to track performance data.

As FIG. 7 shows with the dashed line, operations 702 and 704 may be repeated any number of times. The operations 702 and 704 may repeat, for example, when the game configuration selector 304 communicates another game configuration to another player, that player plays the virtual game using this game configuration, and the client device then communicates the performance data (e.g., the score obtained by the player) back to the performance tracker 308.

In some embodiments, the game configuration manager 306 may organize the game configuration records of the game configuration library. This is shown as operation 706. For example, the game configuration manager 306 may rank the game configuration records according to their corresponding historical performance data, such as according to average score, average number of words found, average time for completion of the game configuration, and the like. As another example, operation 706 may involve the game configuration manager 306 pruning game configuration records using pruning criteria. "Pruning criteria," as used herein, may be a term for data or logic operable to specify a minimum historical performance data threshold that when not satisfied causes the game configuration manager 306 to remove the game configuration from the game configuration library. By way of example and not limitation, the pruning criteria may specify a minimum score for a game configuration to remain in the game configuration library. Thus, those game configurations that are associated with game scores lower than the minimum score specified by the pruning criteria are removed from the game configuration library by the game configuration manager 306. In this way, the game configuration manager 306 may remove game configuration records that may, in some cases, be too difficult and, as a result, increase the likelihood that a player is to receive an interesting game configuration.

As described above, with reference to operation 608 of FIG. 6, some embodiments may use a game configuration heuristic to select a game configuration from a set of game configurations. In some cases, using a game configuration heuristic to select a game configuration from a set of game configurations may allow some embodiments to seed the game configuration library with comparatively interesting game configurations in an efficient manner. Such may be the case because the game configuration heuristic may be a function to measure the level of interest a game configuration may produce when played by a player.

Figure 8:
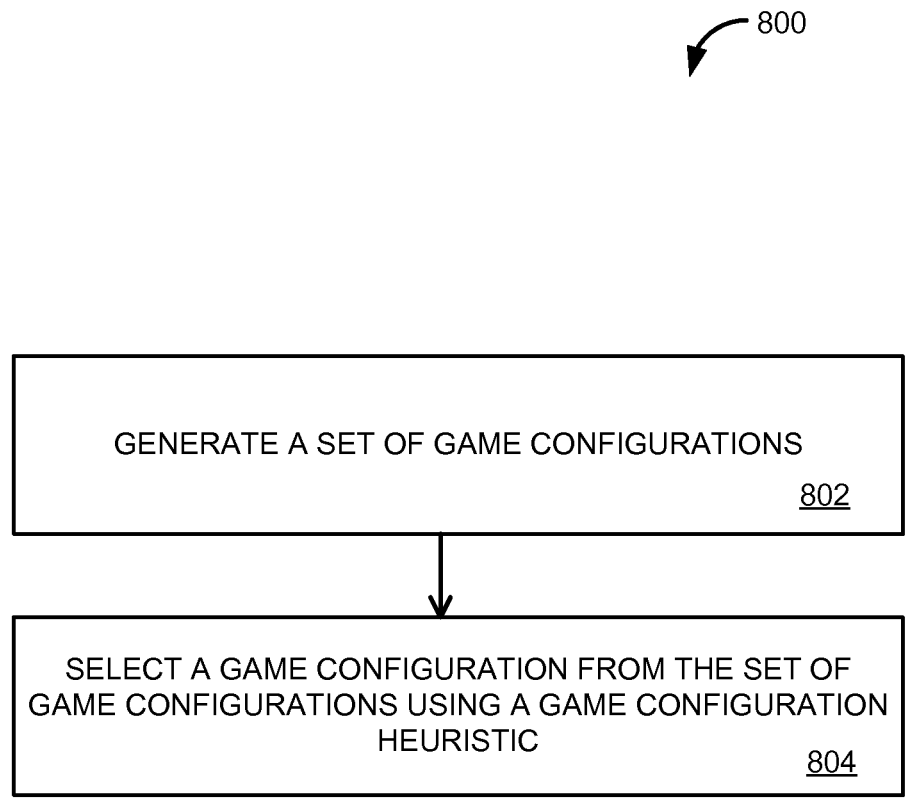
FIG. 8 is a flowchart illustrating a method of using a game configuration heuristic to select a game configuration from a set of game configurations, according to an example embodiment.

To illustrate, FIG. 8 is a flowchart illustrating a method 800 of using a game configuration heuristic to select a game configuration from a set of game configurations, according to an example embodiment. The method 800 may, in some embodiments, be performed by the systems, components, and modules shown in FIG. 3. Accordingly, the method 800 is described with reference to the game engine 302, the game configuration selector 304, the game configuration manager 306, and the performance tracker 308, as shown in FIG. 3.

As shown in FIG. 8, the method 800 may begin at operation 802 when the game configuration selector 304 generates a set (e.g., one or more) of game configurations. In some embodiments, the set of different game configurations are generated by randomly selecting properties for each game configuration. In the example of a word forming game, the game state selector 304 may generate a random game configuration by randomly selecting letters for the tiles in a game board. This process of generating random game configurations may be repeated until the game configuration selector 304 generates a determinable number of random game configurations. According to example embodiments, the size of the set may be a determinable size set by a game developer. For example, the game configuration selector 304 may generate a set of 5, 10, 100, or any other suitable number of game configurations.

At operation 804, the game configuration selector 304 may then select one of the random game configurations from the set of game configurations based on a game configuration heuristic. As described above, the game configuration heuristic may generate a game configuration quality score for each game configuration in the set of game configurations. The game configuration quality score may be generated based on a heuristic that evaluates a number of factors associated with each generated game configuration. For example, the number of possible words that may be formed using a game configuration may be one factor. The number of possible words may be determined based on an exhaustive search using a dictionary that contains words that are usable in a word forming game. Another example may consider the quality of the possible words. Quality may be determined based on historical performances of past games. For example, a certain word may be formed X number of times, whereas another word may be formed Y number of times. Such word counts may indicate that one word is more easily recognized than another word. In some embodiments, rather than keeping word counts representing the number of times that a word is formed in past games, the heuristic may consider a ratio of the number of times that the word was available and then formed.

It is to be appreciated that alternative embodiments to the gaming platform described above are possible. For example, in one embodiment, a game configuration may further include data that specifies bonus features. A bonus feature, as used herein, may refer to a feature that affects the general game play of a game configuration. For example, according to some embodiments, some tiles may be associated with a scoring multiplier. A scoring multiplier may increase the score associated with a tile or a word. As another example, some embodiments may associate the game configuration with a keyword dictionary that increases the score associated with particular words. For example, a keyword dictionary may include words associated with a holiday. Such a holiday keyword dictionary may provide look and feel benefits, especially during the holidays. In some example embodiments, a game configuration heuristic may calculate a game configuration quality score by incorporating data from such bonus features. For example, where the game configuration heuristic identifies that a game configuration includes the ability to form a given word, the game configuration heuristic may increase the game configuration quality score even further if the given word is formed in a tile associated with a scoring multiplier, or the word is found in a holiday keyword dictionary.

Example Game Systems, Social Networks, and Social Graphs

As described above, the systems described herein may include, communicate, or otherwise interact with a game system. As such, a game system is now described to illustrate further embodiments. In an online multiuser game, users control player characters (PCs), a game engine controls non-player characters (NPCs), and the game engine also manages player character state and tracks states for currently active (e.g., online) users and currently inactive (e.g., offline) users. A game engine, in some embodiments, may include a documentation engine. Alternatively, the documentation engine and game engine may be embodied as separate components operated by the game network system and/or the document provision system.

A player character may have a set of attributes and a set of friends associated with the player character. As used herein, the terms "state" and "attribute" can be used interchangeably to refer to any in-game characteristic of a player character, such as location, assets, levels, condition, health, status, inventory, skill set, name, orientation, affiliation, specialty, and so on. The game engine may use a player character state to determine the outcome of a game event, sometimes also considering set variables or random variables. Generally, an outcome is more favorable to a current player character (or player characters) when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine may determine the outcome of a game event according to game rules (e.g., "a character with less than 5 health points will be prevented from initiating an attack"), based on a character's state and possibly also interactions of other player characters and a random calculation. Moreover, an engagement may include simple tasks (e.g., cross the river, shoot at an opponent), complex tasks (e.g., win a battle, unlock a puzzle, build a factory, rob a liquor store), or other events.

In a game system according to aspects of the present disclosure, in determining the outcome of a game event in a game being played by a user (or a group of more than one users), the game engine may take into account the state of the player character (or group of PCs) that is playing, but also the state of one or more PCs of offline/inactive users who are connected to the current user (or PC, or group of PCs) through the game social graph but are not necessarily involved in the game at the time.

For example, User A with six friends on User A's team (e.g., the friends that are listed as being in the user's mob/gang/set/army/business/crew/etc. depending on the nature of the game) may be playing the virtual game and choose to confront User B who has 20 friends on User B's team. In some embodiments, a user may only have first-degree friends on the user's team. In other embodiments, a user may also have second-degree and higher degree friends on the user's team. To resolve the game event, in some embodiments the game engine may total up the weapon strength of the seven members of User A's team and the weapon strength of the 21 members of User B's team and decide an outcome of the confrontation based on a random variable applied to a probability distribution that favors the side with the greater total. In some embodiments, all of this may be done without any other current active participants other than User A (e.g., User A's friends, User, B, and User B's friends could all be offline or inactive). In some embodiments, the friends in a user's team may see a change in their state as part of the outcome of the game event. In some embodiments, the state (assets, condition, level) of friends beyond the first degree are taken into account.

Example Game Networking Systems

A virtual game may be hosted by the game networking system 110, which can be accessed using any suitable connection with a suitable client device 104. A user may have a game account on the game networking system 110, wherein the game account may contain a variety of information associated with the user (e.g., the user's personal information, financial information, purchase history, player character state, game state, etc.). In some embodiments, a user may play multiple games on the game networking system 110, which may maintain a single game account for the user with respect to the multiple games, or multiple individual game accounts for each game with respect to the user. In some embodiments, the game networking system 110 may assign a unique identifier to a user 102 of a virtual game hosted on the game networking system 110. The game networking system 110 may determine that the user 102 is accessing the virtual game by reading the user's cookies, which may be appended to HTTP requests transmitted by the client device 104, and/or by the user 102 logging onto the virtual game.

In some embodiments, the user 102 accesses a virtual game and control the game's progress via the client device 104 (e.g., by inputting commands to the game at the client device 104). The client device 104 can display the game interface, receive inputs from the user 102, transmit user inputs or other events to the game engine, and receive instructions from the game engine. The game engine can be executed on any suitable system (such as, for example, the client device 104, the social networking system 108, or the game networking system 110). For example, the client device 104 may download client components of a virtual game, which are executed locally, while a remote game server, such as the game networking system 110, provides backend support for the client components and may be responsible for maintaining application data of the game, processing the inputs from the user 102, updating and/or synchronizing the game state based on the game logic and each input from the user 102, and transmitting instructions to the client device 104. As another example, when the user 102 provides an input to the game through the client device 104 (such as, for example, by typing on the keyboard or clicking the mouse of the client device 104), the client components of the game may transmit the user's input to the game networking system 110.

In some embodiments, the user 102 accesses particular game instances of a virtual game. A game instance is a copy of a specific game play area that is created during runtime. In some embodiments, a game instance is a discrete game play area where one or more users 102 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables.

In some embodiments, a specific game instance may be associated with one or more specific users. A game instance is associated with a specific user when one or more game parameters of the game instance are associated with the specific user. For example, a game instance associated with a first user may be named "First User's Play Area." This game instance may be populated with the first user's PC and one or more in-game objects associated with the first user.

In some embodiments, a game instance associated with a specific user is only accessible by that specific user. For example, a first user may access a first game instance when playing a virtual game, and this first game instance may be inaccessible to all other users. In other embodiments, a game instance associated with a specific user is accessible by one or more other users, either synchronously or asynchronously with the specific user's game play. For example, a first user may be associated with a first game instance, but the first game instance may be accessed by all first-degree friends in the first user's social network.

In some embodiments, the set of in-game actions available to a specific user is different in a game instance that is associated with this user compared to a game instance that is not associated with this user. The set of in-game actions available to a specific user in a game instance associated with this user may be a subset, superset, or independent of the set of in-game actions available to this user in a game instance that is not associated with him. For example, a first user may be associated with Blackacre Farm in an online farming game, and may be able to plant crops on Blackacre Farm. If the first user accesses a game instance associated with another user, such as Whiteacre Farm, the game engine may not allow the first user to plant crops in that game instance. However, other in-game actions may be available to the first user, such as watering or fertilizing crops on Whiteacre Farm.

In some embodiments, a game engine interfaces with a social graph. Social graphs are models of connections between entities (e.g., individuals, users, contacts, friends, users, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In some embodiments, a unique client identifier may be assigned to individual users in the social graph. This disclosure assumes that at least one entity of a social graph is a user or player character in an online multiuser game.

In some embodiments, the social graph is managed by the game networking system 110, which is managed by the game operator. In other embodiments, the social graph is part of a social networking system 108 managed by a third party (e.g., Facebook, Friendster, Myspace). In yet other embodiments, the user 102 has a social network on both the game networking system 110 and the social networking system 108, wherein the user 102 can have a social network on the game networking system 110 that is a subset, superset, or independent of the user's social network on the social networking system 108. In such combined systems, game network system 110 can maintain social graph information with edge-type attributes that indicate whether a given friend is an "in-game friend," an "out-of-game friend," or both. The various embodiments disclosed herein are operable when the social graph is managed by the social networking system 108, the game networking system 110, or both.

Example Systems and Methods

Returning to FIG. 2, the User 201 may be associated, connected or linked to various other users, or "friends," within the out-of-game social network 250. These associations, connections or links can track relationships between users within the out-of-game social network 250 and are commonly referred to as online "friends" or "friendships" between users. Each friend or friendship in a particular user's social network within a social graph is commonly referred to as a "node." For purposes of illustration, the details of out-of-game social network 250 are described in relation to User 201. As used herein, the terms "user" and "player" can be used interchangeably and can refer to any user in an online multiuser game system or social networking system. As used herein, the term "friend" can mean any node within a user's social network.

As shown in FIG. 2, User 201 has direct connections with several friends. When User 201 has a direct connection with another individual, that connection is referred to as a first-degree friend. In out-of-game social network 250, User 201 has two first-degree friends. That is, User 201 is directly connected to Friend $1_1$ 211 and Friend $2_1$ 221. In social graph 200, it is possible for individuals to be connected to other individuals through their first-degree friends (e.g., friends of friends). As described above, the number of edges in a minimum path that connects a user to another user is considered the degree of separation. For example, FIG. 2 shows that User 201 has three second-degree friends to which User 201 is connected via User 201's connection to User 201's first-degree friends. Second-degree Friend $1_2$ 212 and Friend $2_2$ 222 are connected to User 201 via User 201's first-degree Friend $1_1$ 211. The limit on the depth of friend connections, or the number of degrees of separation for associations, that User 201 is allowed is typically dictated by the restrictions and policies implemented by the social networking system 108.

In various embodiments, User 201 can have Nth-degree friends connected to him through a chain of intermediary degree friends as indicated in FIG. 2. For example, Nth-degree Friend $1_N$ 219 is connected to User 201 within in-game social network 260 via second-degree Friend $3_2$ 232 and one or more other higher-degree friends.

In some embodiments, a user (or player character) has a social graph within an online multiuser game that is maintained by the game engine and another social graph maintained by a separate social networking system. FIG. 2 depicts an example of in-game social network 260 and out-of-game social network 250. In this example, User 201 has out-of-game connections 255 to a plurality of friends, forming out-of-game social network 250. Here, Friend $1_1$ 211 and Friend $2_1$ 221 are first-degree friends with User 201 in User 201's out-of-game social network 250. User 201 also has in-game connections 265 to a plurality of users, forming in-game social network 260. Here, Friend $2_1$ 221, Friend $3_1$ 231, and Friend $4_1$ 241 are first-degree friends with User 201 in User 201's in-game social network 260. In some embodiments, a game engine can access in-game social network 260, out-of-game social network 250, or both.

In some embodiments, the connections in a user's in-game social network is formed both explicitly (e.g., when users "friend" each other) and implicitly (e.g., when the system observes user behaviors and "friends" users to each other). Unless otherwise indicated, reference to a friend connection between two or more users can be interpreted to cover both explicit and implicit connections, using one or more social graphs and other factors to infer friend connections. The friend connections can be unidirectional or bidirectional. It is also not a limitation of this description that two users who are deemed "friends" for the purposes of this disclosure are not friends in real life (e.g., in disintermediated interactions or the like), but that could be the case.

Figure 9:
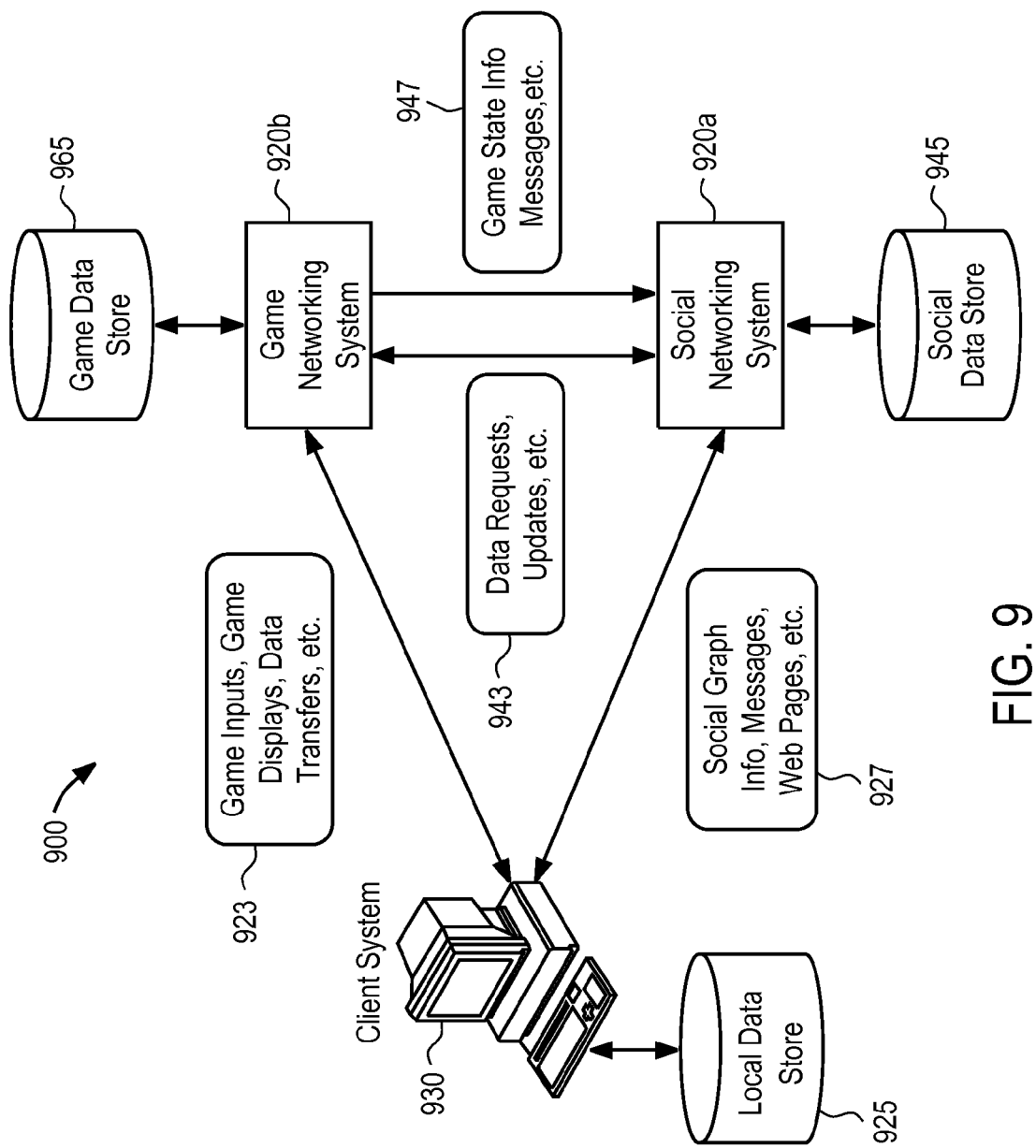
FIG. 9 illustrates an example data flow between example components of the example system of FIG. 1, according to some embodiments.

FIG. 9 illustrates an example data flow between example components of an example system 900. One or more of the components of the example system 900 may correspond to one or more of the components of the example game system 100. In some embodiments, system 900 includes a client system 930, a social networking system 920a, and a game networking system 920b. The components of system 900 can be connected to each other in any suitable configuration, using any suitable type of connection. The components may be connected directly or over any suitable network. The client system 930, the social networking system 920a, and the game networking system 920b may have one or more corresponding data stores such as the local data store 925, the social data store 945, and the game data store 965, respectively.

The client system 930 may receive and transmit data 923 to and from the game networking system 920b. This data can include, for example, a web page, a message, a game input, a game display, a HTTP packet, a data request, transaction information, and other suitable data. At some other time, or at the same time, the game networking system 920b may communicate data 943, 947 (e.g., game state information, game system account information, page info, messages, data requests, updates, etc.) with other networking systems, such as the social networking system 920a (e.g., Facebook, Myspace, etc.). The client system 930 can also receive and transmit data 927 to and from the social networking system 920a. This data can include, for example, web pages, messages, social graph information, social network displays, HTTP packets, data requests, transaction information, updates, and other suitable data.

Communication between the client system 930, the social networking system 920a, and the game networking system 920b can occur over any appropriate electronic communication medium or network using any suitable communications protocols. For example, the client system 930, as well as various servers of the systems described herein, may include Transport Control Protocol/Internet Protocol (TCP/IP) networking stacks to provide for datagram and transport functions. Of course, any other suitable network and transport layer protocols can be utilized.

In some embodiments, an instance of a virtual game is stored as a set of game state parameters that characterize the state of various in-game objects, such as, for example, player character state parameters, non-player character parameters, and virtual item parameters. In some embodiments, game state is maintained in a database as a serialized, unstructured string of text data as a so-called Binary Large Object (BLOB). When a user accesses a virtual game on the game networking system 920b, the BLOB containing the game state for the instance corresponding to the user may be transmitted to the client system 930 for use by a client-side executed object to process. In some embodiments, the client-side executable is a FLASH-based game, which can de-serialize the game state data in the BLOB. As a user plays the game, the game logic implemented at the client system 930 maintains and modifies the various game state parameters locally. The client-side game logic may also batch game events, such as mouse clicks, and transmit these events to the game networking system 920b. Game networking system 920b may itself operate by retrieving a copy of the BLOB from a database or an intermediate memory cache (memcache) layer. The game networking system 920b can also de-serialize the BLOB to resolve the game state parameters and execute its own game logic based on the events in the batch file of events transmitted by the client to synchronize the game state on the server side. The game networking system 920*b* may then re-serialize the game state, now modified into a BLOB, and pass this to a memory cache layer for lazy updates to a persistent database.

In some embodiments, a computer-implemented game is a text-based or turn-based game implemented as a series of web pages that are generated after a user selects one or more actions to perform. The web pages may be displayed in a browser client executed on the client system 930. For example, a client application downloaded to the client system 930 may operate to serve a set of web pages to a user. As another example, a virtual game may be an animated or rendered game executable as a stand-alone application or within the context of a webpage or other structured document. In some embodiments, the virtual game is implemented using Adobe Flash-based technologies. As an example, a game may be fully or partially implemented as a SWF object that is embedded in a web page and executable by a Flash media user plug-in. In some embodiments, one or more described web pages is associated with or accessed by the social networking system 920*a*. This disclosure contemplates using any suitable application for the retrieval and rendering of structured documents hosted by any suitable network-addressable resource or website.

Application event data of a game is any data relevant to the game (e.g., user inputs). In some embodiments, each application datum may have a name and a value, and the value of the application datum may change (e.g., be updated) at any time. When an update to an application datum occurs at the client system 930, either caused by an action of a game user or by the game logic itself, the client system 930 may need to inform the game networking system 920*b* of the update. For example, if the game is a farming game with a harvest mechanic (such as Zynga FarmVille), an event can correspond to a user clicking on a parcel of land to harvest a crop. In such an instance, the application event data may identify an event or action (e.g., harvest) and an object in the game to which the event or action applies.

In some embodiments, one or more objects of a game is represented as an Adobe Flash object. Flash may manipulate vector and raster graphics, and supports bidirectional streaming of audio and video. "Flash" may mean the authoring environment, the user, or the application files. In some embodiments, the client system 930 may include a Flash client. The Flash client may be configured to receive and run Flash application or game object code from any suitable networking system (such as, for example, the social networking system 920*a* or the game networking system 920*b*). In some embodiments, the Flash client is run in a browser client executed on the client system 930. A user can interact with Flash objects using the client system 930 and the Flash client. The Flash objects can represent a variety of in-game objects. Thus, the user may perform various in-game actions on various in-game objects by making various changes and updates to the associated Flash objects.

In some embodiments, in-game actions are initiated by clicking or similarly interacting with a Flash object that represents a particular in-game object. For example, a user can interact with a Flash object to use, move, rotate, delete, attack, shoot, or harvest an in-game object. This disclosure contemplates performing any suitable in-game action by interacting with any suitable Flash object. In some embodiments, when the user makes a change to a Flash object representing an in-game object, the client-executed game logic may update one or more game state parameters associated with the in-game object. To ensure synchronization between the Flash object shown to the user at the client system 930, the Flash client may send the events that caused the game state changes to the in-game object to the game networking system 920*b*. However, to expedite the processing and hence the speed of the overall gaming experience, the Flash client may collect a batch of some number of events or updates into a batch file. The number of events or updates may be determined by the Flash client dynamically or determined by the game networking system 920*b* based on server loads or other factors. For example, client system 930 may send a batch file to the game networking system 920*b* whenever 50 updates have been collected or after a threshold period of time, such as every minute.

As used herein, the term "application event data" may refer to any data relevant to a computer-implemented virtual game application that may affect one or more game state parameters, including, for example and without limitation, changes to user data or metadata, changes to user social connections or contacts, user inputs to the game, and events generated by the game logic. In some embodiments, each application datum has a name and a value. The value of an application datum may change at any time in response to the game play of a user or in response to the game engine (e.g., based on the game logic). In some embodiments, an application data update occurs when the value of a specific application datum is changed.

In some embodiments, when a user plays a virtual game on the client system 930, the game networking system 920*b* serializes all the game-related data, including, for example and without limitation, game states, game events, user inputs, for this particular user and this particular game into a BLOB and may store the BLOB in a database. The BLOB may be associated with an identifier that indicates that the BLOB contains the serialized game-related data for a particular user and a particular virtual game. In some embodiments, while a user is not playing the virtual game, the corresponding BLOB may be stored in the database. This enables a user to stop playing the game at any time without losing the current state of the game the user is in. When a user resumes playing the game next time, game networking system 920*b* may retrieve the corresponding BLOB from the database to determine the most-recent values of the game-related data. In some embodiments, while a user is playing the virtual game, the game networking system 920*b* also loads the corresponding BLOB into a memory cache so that the game system may have faster access to the BLOB and the game-related data contained therein.

Figure 10:
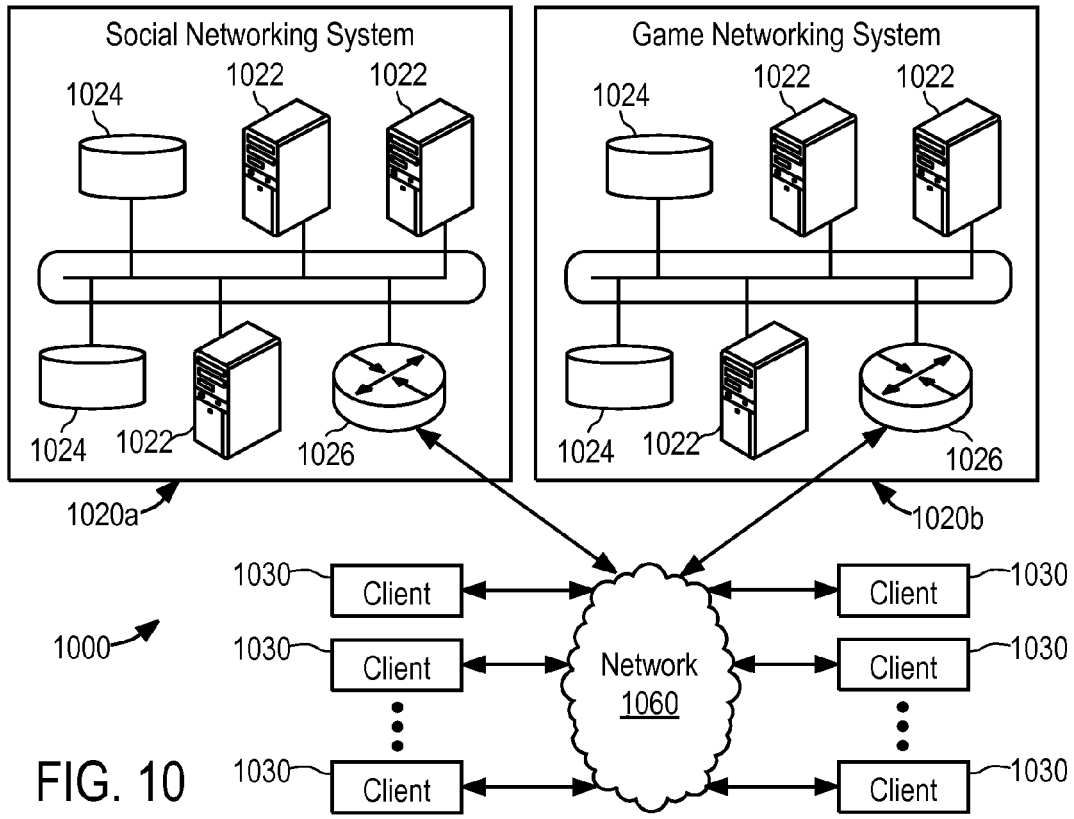
FIG. 10 illustrates an example network environment, in which various example embodiments may operate.

Various embodiments may operate in a wide area network environment, such as the Internet, including multiple network addressable systems. FIG. 10 illustrates an example network environment 1000, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 9 illustrates, various embodiments may operate in a network environment 1000 comprising one or more networking systems, such as a social networking system 1020*a*, a game networking system 1020*b*, and one or more client systems 1030. The components of the social networking system 1020*a* and the game networking system 1020*b* operate analogously; as such, hereinafter they may be referred to simply as the networking system 1020. The client systems 1030 are operably connected to the network environment 1000 via a network service provider, a wireless carrier, or any other suitable means.

The networking system 1020 is a network addressable system that, in various example embodiments, comprises one or more physical servers 1022 and data stores 1024. The one or more physical servers 1022 are operably connected to computer network cloud 1060 via, by way of example, a set of routers and/or networking switches 1026. In an example embodiment, the functionality hosted by the one or more physical servers 1022 may include web or HTTP servers, FTP servers, as well as, without limitation, webpages and applications implemented using Common Gateway Interface (CGI) script, PHP Hyper-text Preprocessor (PHP), Active Server Pages (ASP), Hyper-Text Markup Language (HTML), Extensible Markup Language (XML), Java, JavaScript, Asynchronous JavaScript and XML (AJAX), Flash, ActionScript, and the like.

The physical servers 1022 may host functionality directed to the operations of the networking system 1020. Hereinafter servers 1022 may be referred to as server 1022, although the server 1022 may include numerous servers hosting, for example, the networking system 1020, as well as other content distribution servers, data stores, and databases. Data store 1024 may store content and data relating to, and enabling, operation of, the networking system 1020 as digital data objects. A data object, in some embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc.

Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally include one or more of a large class of data storage and management systems. In some embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

The client system 1030 is generally a computer or computing device including functionality for communicating (e.g., remotely) over a computer network. The client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a Web browser.

When a user at a client system 1030 desires to view a particular webpage (hereinafter also referred to as target structured document) hosted by the networking system 1020, the user's web browser, or other document rendering engine or suitable client application, formulates and transmits a request to the networking system 1020. The request generally includes a URL or other document identifier as well as metadata or other information. By way of example, the request may include information identifying the user, a timestamp identifying when the request was transmitted, and/or location information identifying a geographic location of the user's client system 1030 or a logical network location of the user's client system 1030.

Although the example network environment 1000 described above and illustrated in FIG. 9 is described with respect to the social networking system 1020*a* and the game networking system 1020*b*, this disclosure encompasses any suitable network environment using any suitable systems. For example, a network environment may include online media systems, online reviewing systems, online search engines, online advertising systems, or any combination of two or more such systems.

Figure 11:
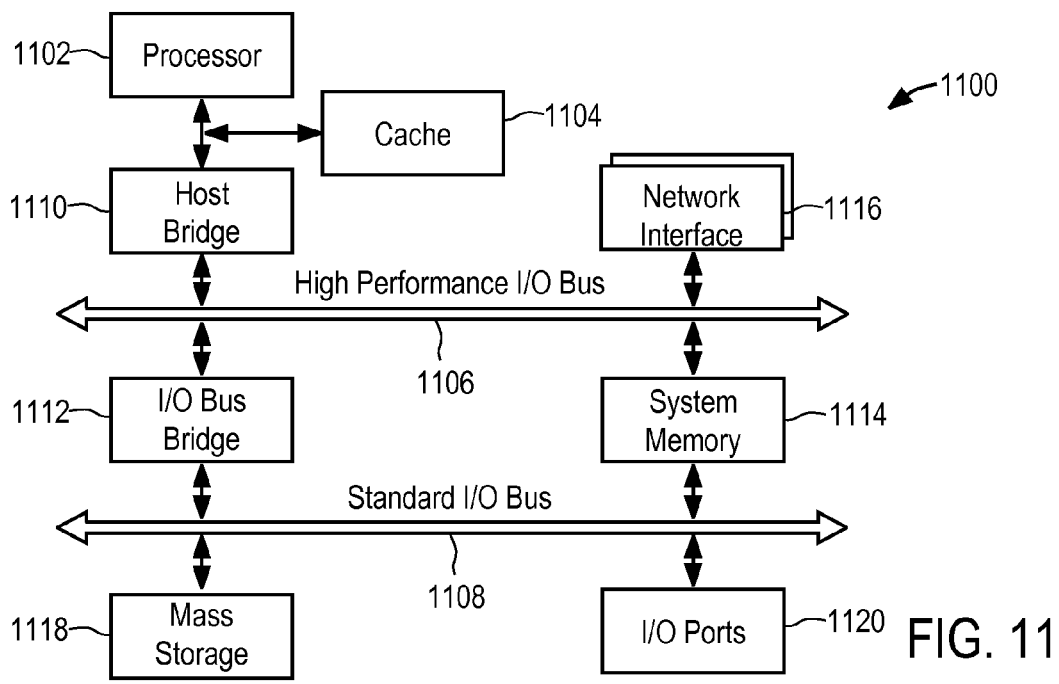
FIG. 11 illustrates an example computing system architecture, which may be used to implement one or more of the methodologies described herein, according to some embodiments.

FIG. 11 is illustrates an example computing system architecture, which may be used to implement a server 1022 or a client system 1030. In one embodiment, the hardware system 1100 comprises a processor 1102, a cache memory 1104, and one or more executable modules and drivers, stored on a tangible computer-readable storage medium, directed to the functions described herein. Additionally, the hardware system 1100 may include a high performance input/output (I/O) bus 1106 and a standard I/O bus 1108. A host bridge 1110 may couple the processor 1102 to the high performance I/O bus 1106, whereas the I/O bus bridge 1112 couples the two buses 1106 and 1108 to each other. A system memory 1114 and one or more network/communication interfaces 1116 may couple to the bus 1106. The hardware system 1100 may further include video memory (not shown) and a display device coupled to the video memory. Mass storage 1118 and I/O ports 1120 may couple to the bus 1108. The hardware system 1100 may optionally include a keyboard, a pointing device, and a display device (not shown) coupled to the bus 1108. Collectively, these elements are intended to represent a broad category of computer hardware systems.

The elements of the hardware system 1100 are described in greater detail below. In particular, the network interface 1116 provides communication between the hardware system 1100 and any of a wide range of networks, such as an Ethernet (e.g., IEEE 802.3) network, a backplane, etc. The mass storage 1118 provides permanent storage for the data and programming instructions to perform the above-described functions implemented in servers 1122 of FIG. 9, whereas system memory 1114 (e.g., DRAM) provides temporary storage for the data and programming instructions when executed by the processor 1102. I/O ports 1120 are one or more serial and/or parallel communication ports that provide communication between additional peripheral devices, which may be coupled to the hardware system 1100.

The hardware system 1100 may include a variety of system architectures and various components of the hardware system 1100 may be rearranged. For example, cache memory 1104 may be on-chip with the processor 1102. Alternatively, the cache memory 1104 and the processor 1102 may be packed together as a "processor module," with processor 1102 being referred to as the "processor core." Furthermore, certain embodiments of the present disclosure may neither require nor include all of the above components. For example, the peripheral devices shown coupled to the standard I/O bus 1108 may couple to the high performance I/O bus 1106. In addition, in some embodiments, only a single bus may exist, with the components of the hardware system 1100 being coupled to the single bus. Furthermore, the hardware system 1100 may include additional components, such as additional processors, storage devices, or memories.

An operating system manages and controls the operation of the hardware system 1100, including the input and output of data to and from software applications (not shown). The operating system provides an interface between the software applications being executed on the system and the hardware components of the system. Any suitable operating system may be used.

Furthermore, the above-described elements and operations may comprise instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions may be executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the embodiments can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer-implemented method, comprising:
   receiving a game configuration request message from a client device being operated by a first player associated with a virtual game on the client device;
   determining, according to a probability function, that a new game configuration is to be randomly generated;
   generating the new game configuration by:
      accessing a set of rules, in a game configuration library data structure stored in a memory device of a computer, for operations applied to at least one user-selectable game virtual object displayed in a prior game configuration of the virtual game; and
      changing at least a portion of the set of rules based at least in part on historical performance data associated with the prior game configuration, the historical performance data representative of accumulated performance data from a group of players that previously played the virtual game according to the prior game configuration;
   adding the new game configuration to a set of game configurations in the game configuration library data structure;
   ranking each game configuration in the set of game configurations according to a game configuration heuristic operable to generate a game configuration quality score for each game configuration in the set of game configurations;
   due to the new game configuration having a highest game configuration quality score, selecting, using at least one processor of the computer, the new game configuration, wherein the changed portion of the set of rules are required for presentation of the virtual game in a graphical user interface displayed at the client device; and
   communicating the new game configuration to the client device.

2. The computer-implemented method of claim 1, wherein the game configuration request message is received from the client device responsive to the first player initiating the graphical user interface for presentation of the virtual game.

3. The computer-implemented method of claim 1, further comprising:
   receiving, from the client device, performance data associated with the first player playing the virtual game according to the new game configuration; and
   updating the historical performance data associated with the new game configuration with the performance data associated with the first player.

4. The computer-implemented method of claim 3, further comprising:
   storing the updated historical performance data in the game configuration library data structure, the game configuration library data structure including additional historical performance data associated with each game configuration in the set of game configurations; and
   prioritizing the new game configuration over the each game configuration in the set of game configurations based on a comparison of the respective historical performance data.

5. The computer-implemented method of claim 1, wherein the historical performance data measures, with respect to the new game configuration, at least one of: an average score, average number of words, user feedback, a time to complete a game board with the selected game configuration, or a success ratio.

6. The computer-implemented method of claim 1, wherein selecting the new game configuration comprises: accessing a game configuration library data structure that includes the set of game configurations, the plurality of game configuration associated with a plurality of performance data.

7. A computer system, comprising:
at least one processor;
a memory device holding an instruction set executable on the processor to cause the computer system to perform operations comprising:
receiving a game configuration request message from a client device being operated by a first player associated with a virtual game on the client device;
determining, according to a probability function, that a new game configuration is to be randomly generated;
generating the new game configuration by:
accessing a set of rules, in a game configuration library data structure stored in a memory device of a computer, for operations applied to at least one user-selectable game virtual object displayed in a prior game configuration of the virtual game; and
changing at least a portion of the set of rules based at least in part on historical performance data associated with the prior game configuration, the historical performance data representative of accumulated performance data from a group of players that previously played the virtual game according to the prior game configuration;
adding the new game configuration to a set of game configurations in the game configuration library data structure,
ranking each game configuration in the set of game configurations according to a game configuration heuristic operable to generate a game configuration quality score for each game configuration in the set of game configurations;
due to the new game configuration having a highest game configuration quality score, selecting, using at least one processor of the computer, the new game configuration, wherein the changed portion of the set of rules are required for presentation of the virtual game in a graphical user interface displayed at the client device; and
communicating the new game configuration to the client device.

8. The computer system of claim 7, wherein the game configuration request message is received from the client device responsive to the first player initiating the graphical user interface for presentation of the virtual game.

9. The computer system of claim 7, further comprising receiving, from the client device, performance data associated with the first player playing the virtual game according to the new game configuration; and
updating the historical performance data associated with the new game configuration with the performance data associated with the first player.

10. The computer system of claim 9, further comprising:
storing the updated historical performance data in the game configuration library data structure, the game configuration library data structure including additional historical performance data associated with each game configuration in the set of game configuration; and
prioritizing the new game configuration over the each game configuration in the set of game configurations based on a comparison of the respective historical performance data.

11. The computer system of claim 7, wherein the historical performance data measures, with respect to the new game configuration, at least one of: an average score, average number of words, user feedback, a time to complete a game board with the selected game configuration, or a success ratio.

12. The computer system of claim 7, wherein selecting the game configuration comprises accessing a game configuration library data structure that includes the set of game configurations associated with a plurality of performance data.

13. A non-transitory computer-readable medium storing executable instructions thereon, which, when executed by a processor, cause the processor to perform operations comprising:
receiving a game configuration request message from a client device being operated by a first player associated with a virtual game on the client device;
determining, according to a probability function, that a new game configuration is to be randomly generated;
generating the new game configuration by:
accessing a set of rules, in a game configuration library data structure stored in a memory device of a computer, for operations applied to at least one user-selectable game virtual object displayed in a prior game configuration of the virtual game; and
changing at least a portion of the set of rules based at least in part on historical performance data associated with the prior game configuration, the historical performance data representative of accumulated performance data from a group of players that previously played the virtual game according to the prior game configuration;
adding the new game configuration to a set of game configurations in the game configuration library data structure;
ranking each game configuration in the set of game configurations according to a game configuration heuristic operable to generate a game configuration quality score for each game configuration in the set of game configurations;
due to the new game configuration having a highest game configuration quality score, selecting, the new game configuration, wherein the changed portion of the set of rules are required for presentation of the virtual game in a graphical user interface displayed at the client device; and
communicating the new game configuration to the client device.

* * * * *

UNITED STATES PATENT AND TRADEMARK OFFICE
CERTIFICATE OF CORRECTION

PATENT NO. : 9,744,440 B1
APPLICATION NO. : 13/739343
DATED : August 29, 2017
INVENTOR(S) : Graham et al.

It is certified that error appears in the above-identified patent and that said Letters Patent is hereby corrected as shown below:

In the Specification

In Column 9, Line 49, delete "302" and insert --308-- therefor

In Column 9, Line 62, delete "302" and insert --308-- therefor

In Column 20, Line 43, delete "1122" and insert --1022-- therefor

In the Claims

In Column 23, Line 33, in Claim 7, delete "structure," and insert --structure;-- therefor In Column 23, Line 52, in Claim 9, delete "comprising" and insert --comprising:-- therefor In Column 24, Line 6, in Claim 10, delete "configuration;" and insert --configurations;-- therefor Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*